3,040,037
PROCESS FOR THE AROMATIZATION OF RING A OF STEROID COMPOUNDS
Kyosuke Tsuda, Urawa City, Eiji Oki, Tokyo, Shigeo Nozoe, Kamakura City, and Yutaka Okada, Tokyo, Japan, assignors to Sankyo Company, Limited, Tokyo, Japan
No Drawing. Filed Sept. 12, 1961, Ser. No. 137,527
Claims priority, application Japan Mar. 29, 1961
4 Claims. (Cl. 260—239.55)

This invention relates to a process for effecting aromatization of a ring A and demethylation of the methyl group at 19 position of steroid compounds. More particularly, it relates to a process for preparing 19-nor steroid compounds with aromatized ring A having the formula

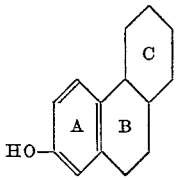

(I)

insofar as rings A, B and C of the steroid nucleus are concerned, said compounds having one double bond between two carbon atoms of the steroid nucleus at one of 6(7), 8(9) and 9(11) positions, by aromatization of the ring A and demethylation of the methyl group at 19 position of the corresponding 3 keto-1, 4-diene steroid compounds having the formula

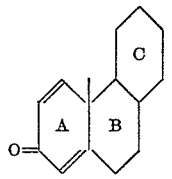

(II)

insofar as ring A, B and C of the steroid nucleus are concerned.

It has been heretofore proposed to produce steroid compounds with aromatized ring A from the corresponding steroid compounds by thermal degradation (H. H. Inhoffen: Angew. Chem. 53, 471 (1940)), or by heating in mineral oil (C. Djerassi et al.: J. Am. Chem. Soc. 73, 1523 (1951); ibid. 72, 4543 (1950); E. B. Hershberg, M. Rubin, E. Schwenck: J. Org. Chem. 15, 292 (1950)). However, use of these methods is very limited because they cannot be applied to steroid compounds having substituents unstable to heat on the steroid nucleus owing to the use of high temperature such as about 600° C. Moreover, it is disadvantageous that low yield of the desired product and complicated procedures are associated with these methods.

Furthermore, method of ring A aromatization of steroid compounds by means of acid is known. However, there occurs in this method migration of the angular methyl group to ring A with the result that such compounds as having the Formula I cannot be prepared by this method.

It is an object of this invention to provide a process for converting 3-keto-1,4-diene steroid compounds having the above-described Formula II insofar as rings A, B and C of the steroid nucleus are concerned to the corresponding 19-nor steroid compounds with aromatized ring A having the above-described Formula I insofar as rings A, B and C of the steroid nucleus are concerned without the above-mentioned disadvantages in an economically advantageous way. Other objects of this invention will be apparent herein below.

According to the present invention, the aforementioned object can be achieved by treating a 3-keto-1.4-diene steroid compound having the above-described Formula II insofar as rings A, B and C of the steroid nucleus are concerned with zinc in an aromatic basic solvent selected from the group consisting of pyridine, picolines, lutidines, collidines, quinoline, isoquinoline, aniline and dimethylaniline containing a small amount of water to form the corresponding 19-nor steroid compound with aromatized ring A having the above-mentioned Formula I insofar as rings A, B and C of the steroid nucleus are concerned.

In carrying out the present invention it is preferable to dissolve a starting steroid compound in an aromatic basic solvent as mentioned above containing about 1 to 200 moles, preferably about 5 to 20 moles, of water per mole of the steroid compound, adding zinc to the solution and heating the resulting mixture under reflux for about 15 min. to 4 hrs. The time required for the reaction may vary depending upon the relative amount of zinc added to the solution based on that of the starting steroid compounds, activity of the zinc, amount of water contained in the aromatic basic solvent and reaction temperature. Amount of zinc used may be sufficiently large to effect conversion of the starting steroid compound to the desired product, but about 2 to 30 g. of zinc per gram of the starting steroid compound are preferably used.

After completion of the reaction the desired product may be isolated from the reaction mixture by conventional methods. For example, after completion of the reaction the reaction mixture is cooled, the zinc is removed by filtration, water is added to the filtrate directly or after concentration, the resulting mixture is subjected to extraction with a water-immiscible solvent such as chloroform, diethyl ether or ethyl acetate, is removed the solvent from the extract and the residue is recrystallized from acetone, ethanol or ethyl acetate to give the desired product.

Representative of the 3-keto-1,4-diene steroid compounds used as the starting material in the process according to the present invention are 17β-hydroxyandrosta-1,4,6-triene-3-one, 17β-acetoxyandrosta-1,4,6-triene-3-one, androsta-1,4,6-triene-3,17-dione, pregna-1,4,6,16-tetraene-3,20-dione, 17α,21-dihydroxypregna-1,4,6-triene-3,20-dione 21-acetate, androsta-1,4,9(11)-triene-3,17-dione, 17α, 21 - dihydroxypregna-1,4,9(11)-triene-3,20-dione 21-acetate, 11β - hydroxyandrosta-1,4,8-triene-3,17-dione, 11β, 17β-dihydroxyandrosta - 1,4,8-triene-3 - one, 11β,17α,21-trihydroxypregna - 1,4,8 - triene-3,20-dione 21-acetate, 11β - hydroxypregna-1,4,8-triene-3,20-dione, 17β-hydroxyandrosta - 1,4,9(11) - triene-3-one, 17β-acetoxyandrosta-1,4,9(11) - triene-3-one, pregnan-1,4,9(11)-triene-3,20-dione, 17α,21 - dihydroxypregna-1,4,9(11)-triene-3,20-dione BMD, 11β,17β-dihydroxyandrosta - 1,4,8-triene-3-one 17-acetate, 11β-hydroxyandrosta-1,4,6-triene - 3,17-dione, cholesta-1,4,6 - triene-3-one, ergosta-1,4,6,22-tetraene-3-one, stigmasta - 1,4,6,22-tetraene-3-one, spirosta-1,4,9(11)-triene-3-one, 11β - hydroxyspirosta-1,4,8-triene-3-one, and 17α - methylandrosta-1,4,9(11)-triene-17β-ol-3-one.

The above-mentioned 3-keto-1,4-diene steroid compounds are converted by the process according to the present invention to the corresponding compounds as follows: Δ⁶-estradiol, Δ⁶-estradiol 17-acetate, Δ⁶-estrone, 19-norpregna- 1,3,5(10),6,16-pentaene - 3-ol-20-one, 19-norpregna - 1,3,5(10),6 - tetraene - 3,17α,21-triol-20-one 21-acetate, estra - 1,3,5(10),9(11),-tetraene-3-ol-17 - one (Δ⁹⁽¹¹⁾ - estrone), 19-norpregna-1,3,5(10),9(11)-tetraene-3,17α, 21-triol-20-one 21-acetate, 3,11-dihydroxyestra-1,3,5(10),8 - tetraene-17-one(11β - hydroxy - Δ⁸-estrone), 3,11β,17β - trihydroxyestra-1,3,5(10),8 - tetraene(11β-hydroxy - Δ⁸ - estradiol), 19-norpregna-1,3,5(10),8-tetraene-3,11β,17α,21 - tetraol-20-one 21-acetate, 19-norpregna - 1,3,5(10),8 - tetraene-3,11β-diol-20-one; 3,17β-dihydroxyestra - 1,3,5(10),9(11) - tetraene, 3,17β-dihydroxyestra-1,3,5(10),9(11) - tetraene 17-acetate, 19-norpregnan - 1,3,5(10),9(11) - tetraene-3-ol-20-one, 9-norpregnan - 1,3,5(10),9(11)-tetraene-3,17α,21-triol-20-one BMD, 3,11β17α - trihydroxyestra-1,3,5(10),8 - tetraene 17-acetate; 3,11β - dihydroxyestra-1,3,5(10),6-tetraene-17-one, 19 - norcholesta-1,3,5(10),6 - tetraene-3-ol, 19-norergosta - 1,3,5(10),6,22 - pentaene-3-ol, 19-norstigmasta - 1,3,5(10),6,22-pentaene - 3-ol, 19-norspirosta-1,3,5(10),9(11)-tetraene-3-ol, 19 - norspirosta-1,3,5(10),8-tetraene-3,11β-diol, 17α - methylestra - 1,3,5(10),9(11)-tetraene-3,17β-diol.

The following examples are given as illustrative of our process, but are not intended to be limitative upon the scope thereof.

Example 1

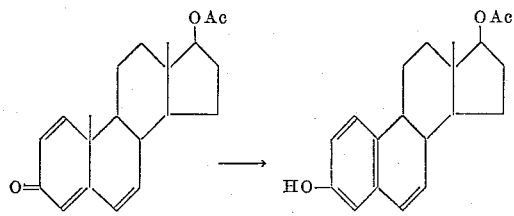

To a solution of 300 mg. of 17β-acetoxyandrosta-1,4,6-triene-3-one in 20 ml. of pyridine containing about 1.5 moles of water per mole of the starting material are added 6 g. of zinc dust freshly washed with diluted hydrochloric acid and then with water. The mixture is heated under reflux with stirring for 3 hrs. The zinc is removed by filtration, followed by washed with diethyl ether. The filtrate is weakly acidified with 10% hydrochloric acid and extracted with diethyl ether. The ether extract is washed with water and dried over anhydrous sodium sulfate. The ether is distilled off and a small amount of methanol is added to the residue. Standing in a cold place gives crystals precipitated, which are removed by filtration and recrystallized from methanol. $\Delta^6$-estradiol 17-acetate, M.P. 250–251° C., λ max. 262 mμ (ε 8900), 303 mμ (ε 2700), weighing 70 mg. is obtained.

Example 2

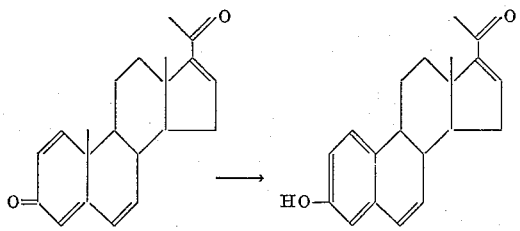

To a solution of 300 mg. of pregna-1,4,6,16-tetraene-3,20-dione in 20 ml. of pyridine containing about 1.5 moles of water per mole of the starting material are added 10 g. of zinc dust. The mixture is heated under reflux with stirring for 3 hrs. The zinc dust is removed by filtration and washed with diethyl ether. The filtrate, after acidified with 10% hydrochloric acid, is extracted with diethyl ether. The extract is washed with water and dried over anhydrous sodium sulfate. The ether is distilled off to give 210 mg. of an oily substance. The oil is dissolved in 100 ml. of benzene and the benzene solution is chromatographed on 20 g. of silica gel. Crystals obtained from a fraction eluted with benzene-diethyl ether (99:1) are recrystallized from methanol to give 40 mg. of 19-norpregna-1,3,5(10),6,16-pentaene-3-ol-20-one as colorless prisms melting at 241–242° C.; λ max. 224 mμ (ε 38000), 270 mμ (ε 6800), 304 mμ (ε 2700).

Example 3

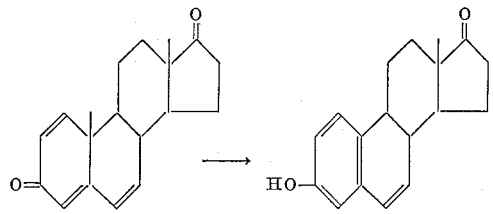

A mixture of 300 mg. of androsta-1,4,6-triene-3,17-dione, 30 ml. of pyridine containing about 1.5 moles of water per mole of the starting material and 10 g. of zinc dust is heated under reflux for 3 hrs. The zinc is removed by filtration and washed with diethyl ether. The filtrate is weakly acidified with 10% hydrochloric acid followed by extraction with diethyl ether. The ether layer is washed with water and dried over anhydrous sodium sulfate. The ether is distilled off and the residue is heated with 10% aqueous solution of potassium hydroxide followed by removal of the undissolved material by filtration. The alkaline solution is acidified and the resulting acid solution is extracted with diethyl ether. The diethyl ether layer is washed with water and dried. The ether is then distilled off and the crystals obtained are recrystallized from methanol to yield 80 mg. of $\Delta^6$-estrone; M.P. 261–263° C.; α D–1300 (in dioxane); λ max. 220 mμ (ε 31000), 262 mμ (ε 8900), 304 mμ (ε 2750).

Example 4

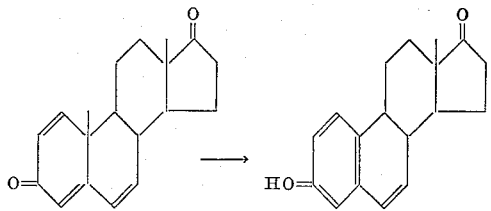

A mixture of 500 mg. of androsta-1,4,9(11)-triene-3,17-dione, 50 ml. of pyridine containing about 1.5 moles of water per mole of the starting material and 10 g. of zinc dust is heated under reflux with stirring for 3 hrs. The zinc is removed by filtration and washed with diethyl ether. The filtrate, after weakly acidified with 10% hydrochloric acid, is extracted with diethyl ether. The extract is washed with water and dried. The diethyl ether is then distilled off and the residue is recrystallized from methanol to give 400 m. of $\Delta^{9(11)}$-estrone melting at 255–257° C.

Analysis.—Calcd. for $C_{18}H_{20}O_2$: C, 80.56; H, 7.51. Found: C, 80.36; H, 7.45.

$\gamma_{max.}^{CH_3OH}$ 263 mμ (ε 18000), 299 mμ (ε 3200)

Example 5

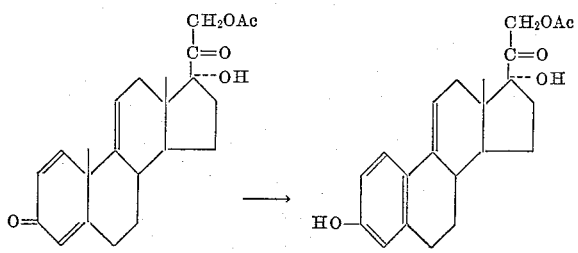

To a solution of 1 g. of 17β,21-dihydroxypregna-1,4,9(11)-triene-3,20-dione 21-acetate, M.P. 224–225° C., in 50 ml. of pyridine containing about 1.5 moles of water per mole of the starting material are added 20 g. of zinc dust successively washed with hydrochloric acid, water and acetone-ether. The mixture is heated under reflux with stirring for 1 hr. After removal of the zinc from the resulting reaction mixture the filtrate is poured into water and extracted with diethyl ether. The ether layer is washed with 10% hydrochloric acid and water and dried over anhydrous sodium sulfate. The ether is then distilled off and the residue is recrystallized from methanol to give 500 mg. of 19-norpregna-1,3,5(10),9(11)-tetraene-20-one-3,17α,21-triol 21-acetate as leaflets melting at 210–212° C.

$\lambda_{max.}^{CH_3OH}$ 263 mμ (ε 18000), 298 mμ (ε 3200)

*Analysis.*—Calcd. for $C_{22}H_{26}O_5$: C, 71.33; H, 7.08. Found: C, 71.20; H, 7.00.

$\lambda_{max.}^{Nujol}$ 3415, 1732, 1718, 1632, 1613,
1498, 1230, 876, 814 cm.$^{-1}$

*Example 6*

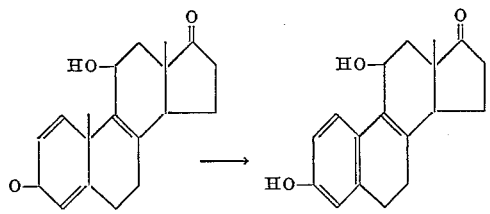

To a solution of 1 g. of 11β-hydroxyandrosta-1,4,8-triene-3,17-dione in 30 ml. of pyridine are added 15 g. of zinc dust and 1 ml. of water. The mixture is heated under reflux with stirring for 1 hr. After cooling the zinc is removed from the reaction mixture by filtration and the filtrate is poured into a large amount of water and extracted with methylene chloride. The methylene chloride layer is washed with diluted hydrochloric acid and water successively and dried over anhydrous sodium sulfate. The solvent is then distilled off to yield 920 mg. of an oily substance. The oil is allowed to stand in a cold place to crystallize. The crystals are removed by filtration and recrystallized from acetone-ether to give 612 mg. of 3,11β-dihydroxyestra-1,3,5(10),8-tetraene-17-one melting at 186–187° C., dec. (colored).

*Analysis.*—Calcd. for $C_{18}H_{20}O_3$: C, 76.03; H, 7.09. Found: C, 76.12; H, 7.06.

$\lambda_{max.}^{CH_3OH}$ 279 mμ (ε 18400)

*Example 7*

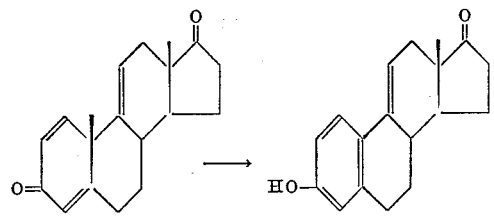

To a solution of 564 mg. of androsta-1,4,9(11)-triene-3,17-dione in 20 ml. of α-picoline are added 0.5 ml. of water and 10 g. of zinc dust successively washed with diluted hydrochloric acid and water. The mixture is heated under reflux with stirring for 30 min. After cooling, the zinc is removed by filtration and the filtrate is poured into a large amount of water followed by extraction with methylene chloride. The extract is washed with 1% hydrochloric acid to an acid washing, and then with 1% aqueous solution of sodium bicarbonate and water. After dried over anhydrous sodium sulfate the solvent is distilled off and the residue is recrystallized from acetone-ether to give 450 mg. of $\Delta^{9(11)}$-estrone melting at 255–258° C.

$\lambda_{max.}^{CH_3OH}$ 263 mμ (ε 18000), 299 mμ (ε 3200)

*Example 8*

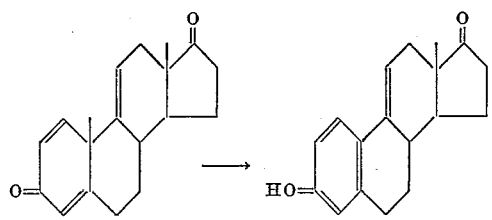

The same procedures are repeated as those described in Example 7 except that 20 ml. of lutidine are used in place of the picoline to obtain 430 mg. of $\Delta^{9(11)}$-estrone.

*Example 9*

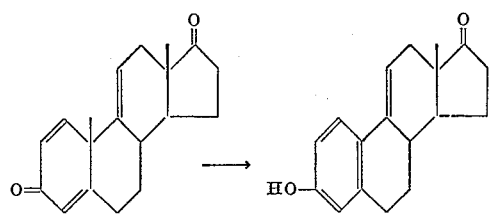

The same procedures are repeated as those in Example 7 except that 20 ml. of syn.-collidine are used in place of the α-picoline to obtain 400 mg. of $\Delta^{9(11)}$-estrone.

*Example 10*

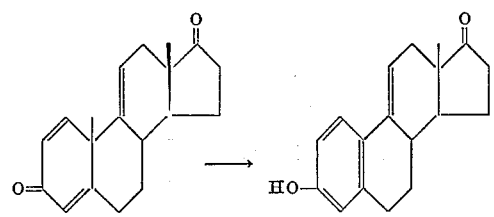

The same procedures are repeated as those in Example 7 except that 20 ml. of quinoline are used in place of the α-picoline to obtain 380 mg. of $\Delta^{9(11)}$-estrone.

*Example 11*

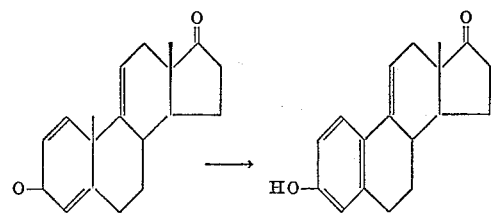

The same procedures are repeated as those in Example 7 except that 20 ml. of dimethylaniline are used in place of the α-picoline to obtain 300 mg. of $\Delta^{9(11)}$-estrone.

*Example 12*

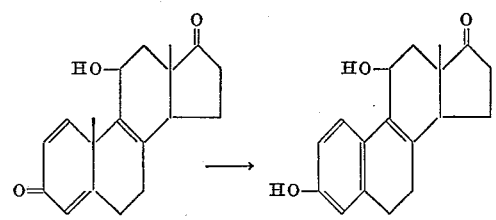

To a solution of 596 mg. of 11β-hydroxyandrosta-1,4,8-triene-3,17-dione in 20 ml. of α-picoline are added 0.72 ml. of water and 10 g. of zinc dust successively washed with diluted hydrochloric acid and water. The mixture is heated under reflux with stirring for 30 min. After cooling the zinc dust is removed by filtration and the filtrate is poured into a large amount of water followed by extraction with ethyl acetate. The extract is washed with 1% hydrochloric acid chilled with ice to remove α-picoline, immediately followed by washing with 1% aqueous solution of sodium bicarbonate. The extract is then washed with water and dried. The ethyl acetate is distilled off and the residue is recrystallized from acetone-ether to give 410 mg. of 3,11β-dihydroxyestra-1,3,5(10),8-tetraene-17-one melting at 184–187° C. with decomposition.

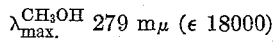

We claim:

1. A process for preparing 19-nor steroid compounds with aromatized ring A having the formula

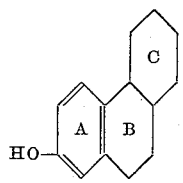

insofar as rings A, B and C of the steroid nucleus are concerned, said compounds having one double bond between two carbon atoms of the steroid nucleus at one of 6(7), 8(9) and 9(11) positions which comprises treating the corresponding 3-keto-1,4-diene steroid compound having the formula

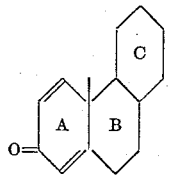

with zinc in an aromatic basic solvent selected from the group consisting of pyridine, picolines, lutidines, collidines, quinoline, isoquinoline, aniline and dimethylaniline, said base containing a small amount of water.

2. A process for preparing 19-nor steroid compounds with aromatized ring A having the formula

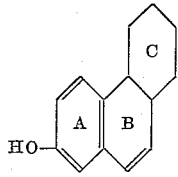

insofar as rings A, B and C of the steroid nucleus are concerned which comprises treating the corrseponding 3-keto-1,4-diene steroid compound having the formula

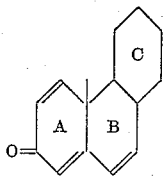

with zinc in an aromatic basic solvent selected from the group consisting of pyridine, picolines, lutidines, collidines, quinoline, isoquinoline, aniline and dimethylaniline, said base containing a small amount of water.

3. A process for preparing 19-nor steroid compounds with aromatized ring A having the formula

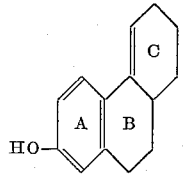

insofar as rings A, B and C of the steroid nucleus are concerned which comprises treating the corresponding 3-keto-1,4-diene steroid compound having the formula

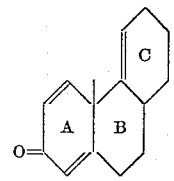

with zinc in an aromatic basic solvent selected from the group consisting of pyridine, picolines, lutidines, collidines, quinoline, isoquinoline, aniline and dimethylaniline, said base containing a small amount of water.

4. A process for preparing 19-nor steroid compound with aromatized ring A having the formula

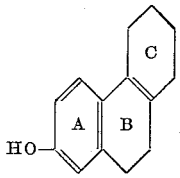

insofar as rings A, B and C of the steroid nucleus are concerned which comprises treating the corresponding 3-keto-1,4-diene steroid compound having the formula

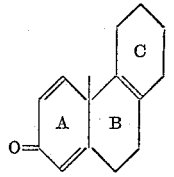

with zinc in an aromatic basic solvent selected from the group consisting of pyridine, picolines, lutidines, collidines, quinoline, isoquinoline, aniline and dimethylaniline, said base containing a small amount of water.

No references cited.